United States Patent [19]

Brown et al.

[11] Patent Number: 4,579,421

[45] Date of Patent: Apr. 1, 1986

[54] OPTICAL ADAPTIVE FILTER

[75] Inventors: Douglas E. Brown, Columbia; Joanne F. Rhodes, Hanover, both of Md.

[73] Assignee: The United States of America as represented by the Director of the National Security Agency, Washington, D.C.

[21] Appl. No.: 539,270

[22] Filed: Oct. 5, 1983

[51] Int. Cl.[4] ........................ G02B 5/30; G02B 27/46; G02F 1/133

[52] U.S. Cl. ............................... 350/162.12; 350/342; 350/311

[58] Field of Search .............. 350/311, 162.12, 162.13, 350/356, 342; 364/822, 825

[56] References Cited

U.S. PATENT DOCUMENTS

| | | | |
|---|---|---|---|
| 3,592,527 | 7/1971 | Gary et al. | 350/342 |
| 3,744,879 | 7/1973 | Beard et al. | 350/162.12 |
| 4,225,938 | 9/1980 | Turpin | 364/822 |
| 4,310,894 | 1/1982 | Lee et al. | 364/822 |
| 4,368,386 | 1/1983 | Huignard et al. | 350/342 |
| 4,389,092 | 6/1983 | Tamura | 350/162.12 |
| 4,440,472 | 4/1984 | Cohen | 350/162.12 |
| 4,468,093 | 8/1984 | Brown | 350/162.12 |

OTHER PUBLICATIONS

IBM Technical Disclosure Bulletin, vol. 19, No. 6, Nov. 1976.

Electronics, Dec. 6, 1979.

Vander Lugt, A., "Adaptive Optical Processor", *Applied Optics*, vol. 21, No. 22, pp. 4005–4011, Nov. 15, 1982.

Rhodes, Joanne F. and Brown, Douglas E., "Adaptive Filtering with Correlation Cancellation Loops," *Real Time Signal Processing V*, SPIE, 341, pp. 140–147, Dec. 28, 1982.

*Primary Examiner*—John K. Corbin
*Assistant Examiner*—Loha Ben
*Attorney, Agent, or Firm*—Thomas O. Maser; John R. Utermohle

[57] ABSTRACT

An electrooptic apparatus is disclosed for linear predictive adaptive filtering. The apparatus combines the desirable filtering effects of a correlation cancellation loop method of linear prediction with the parallelism and large bandwidth capabilities of optical processing.

9 Claims, 4 Drawing Figures

OPTICAL ADAPTIVE FILTER

BACKGROUND OF THE INVENTION

1. Field of the Invention

My invention relates to the field of optical signals processing, and more particularly to adaptive filtering of signals by optical linear predictive techniques.

2. Description of the Prior Art

Adaptive filtering refers generally to the process of dynamically altering a filter transfer function to compensate for changes in input characteristics. A particular type of adaptive filter, known as an adaptive filter linear predictor, functions by sampling the input signal at predetermined time delays and appropriately weighting each sample such that the sum of the samples provides a best estimate of the next received sample. Linear predictors are well known with applications in both analog and digital electrical signals processing, but until now there have been no known embodiments suitable for use in the processing of signals using optical techniques.

Optical signal processing is finding increased utility for many applications, such as those requiring large bandwidths. There is a need for an optical processor capable of adaptive filtering by linear prediction.

SUMMARY OF THE INVENTION

It is an object of my invention to provide an optical adaptive filter.

It is a further object to achieve an adaptive filter suitable for use with large bandwidth applications.

Still another object is to produce an adaptive filter exhibiting the property of low electromagnetic emanations.

It is also an object to provide an adaptive filter having reduced size and simpler construction than those currently available.

An optical adaptive filter having these and other desirable qualities would include a source of an electrical information signal; a first source of light; first modulating means for intensity modulating the output of said first light source in response to an electrical signal to produce a first intermediate optical signal; second modulating means for modulating said first intermediate optical signal in response to delayed samples of said information signal to produce a second intermediate optical signal; means for integrating said second intermediate optical signal; a second source of coherent light; third modulating means for modulating the output of said second light source in accordance with the integrated values of said second intermediate optical signal to produce a third intermediate optical signal; fourth modulating means for modulating said third intermediate optical signal proportional to the integrated signals in response to delayed samples of said information signal to provide a fourth intermediate optical signal comprising a plurality of weighted samples; means for converting said fourth intermediate optical signal into an electrical output representative of the sum of said weighted samples; means for producing an electrical signal representing the difference of said electrical output and said information signal; and means for providing said difference signal to said first modulating means.

BRIEF DESCRIPTION OF THE DRAWINGS

My invention may be best understood by reading the following description with reference to the drawings, in which.

DESCRIPTION OF THE PREFERRED EMBODIMENT

It is well known that the current amplitude of a signal x(t) may be approximated by a weighted linear sum of its equally spaced past values. The approximated signal $\hat{x}(t)$ is defined by the term $$\sum_{n=1}^{N} a_n x(t - nT)$$

where $a_n$ is the weighting factor of each input sample and T is the sampling interval. The optimum weights $a_n$ must be determined through an interactive calculation utilizing least mean squares analysis where $[x(t)-\hat{x}(t)]$ is the error and $E\{[x(t)-\hat{x}(t)]^2\}$ is the mean squared error. To obtain an expression for the minimum mean squared error, the partial derivative is taken with respect to each $a_n$ and set equal to zero. For a particular $a_n=a_p$, $$\frac{\partial}{\partial a_p}[E\{[x(t)-\hat{x}(t)]^2\}] = E\left\{\frac{\partial}{\partial a_p}[x(t)-\hat{x}(t)]^2\right\} = 0.$$

Since $\alpha\hat{x}(t)/\alpha a_p=\hat{x}(t-pT)$, it follows that $$E\{[x(t)-\hat{x}(t)]x(t-pT)\}=0$$

for all p=1, 2, . . . , N.

The substitution of $\hat{x}(t)$ yields $$E\left\{\left[x(t)-\sum_{n=1}^{N} a_n x(t-nT)\right]\hat{x}(t-pT)\right\} = 0,$$

which may be rewritten as $$E\{[x(t)x(t-pT)\} = E\left\{\sum_{n=1}^{N} a_n x(t-nT)x(t-pT)\right\}.$$

The $a_n$ values are constants, thus $$E\{x(t)x(t-pT)\} = \sum_{n=1}^{N} a_n E\{x(t-nT)x(t-pT)\}.$$

A method for determining the $a_n$ values in the above relationship is known which utilizes what has come to be known as a correlation cancellation loop. The device has been described in: Dennis R. Morgan and Samuel E. Craig, "Real-Time Adaptive Prediction Using the Least Mean Square Gradient Algorithm", *IEEE Trans. Acoust., Speech, Signal Processing,* Vol. ASSP-24, pp.

494–507, December 1976, incorporated herein by reference. Our invention is an optical linear predictor utilizing correlation cancellation loops as basic building blocks.

Figure 1:
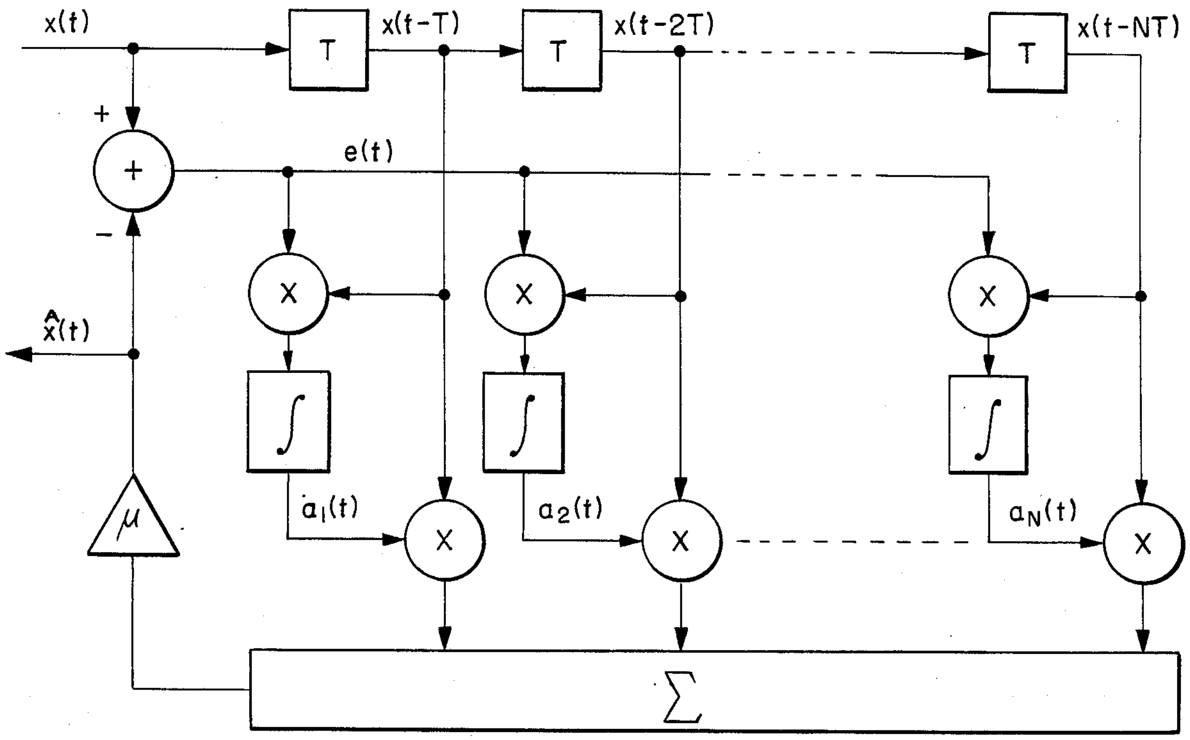
FIG. 1. (PRIOR ART)
FIG. 1 is a block diagram representative of a prior art adaptive filter.

FIG. 1 illustrates a generalized adaptive linear predictor constructed with correlation cancellation loops typical of the prior art. Because the operation of this device is well known and fully described in the cited reference, it will not be repeated here.

Figure 2:
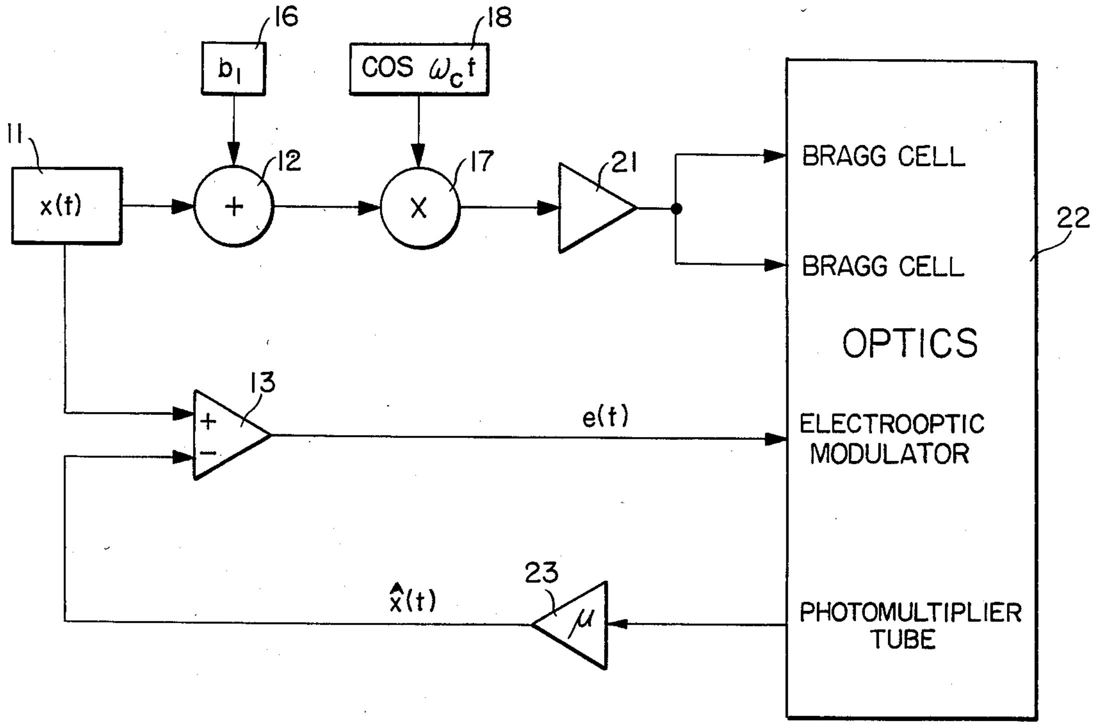
FIG. 2 is a block diagram of the optical adaptive filter of my invention.

FIG. 2 is a block diagram of an optical adaptive filter representative of my invention. It includes a source of electrical signals 11 connected to an adder 12 and the positive input of a differential amplifier 13. A bias source 16 supplies a signal $b_1$ to a second input of adder 12. A multiplier 17 combines the output of adder 12 with a signal from source 18, and the resulting product is fed through an amplifier 21 to first and second Bragg cells within an optical processor 22. Processor 22 will be described in detail hereinbelow. A signal from a photomultiplier tube within processor 22 is routed through an amplifier 23 to the negative input of differential amplifier 13. The difference signal from amplifier 13 is provided to an electrooptic modulator within processor 22.

Figure 3:
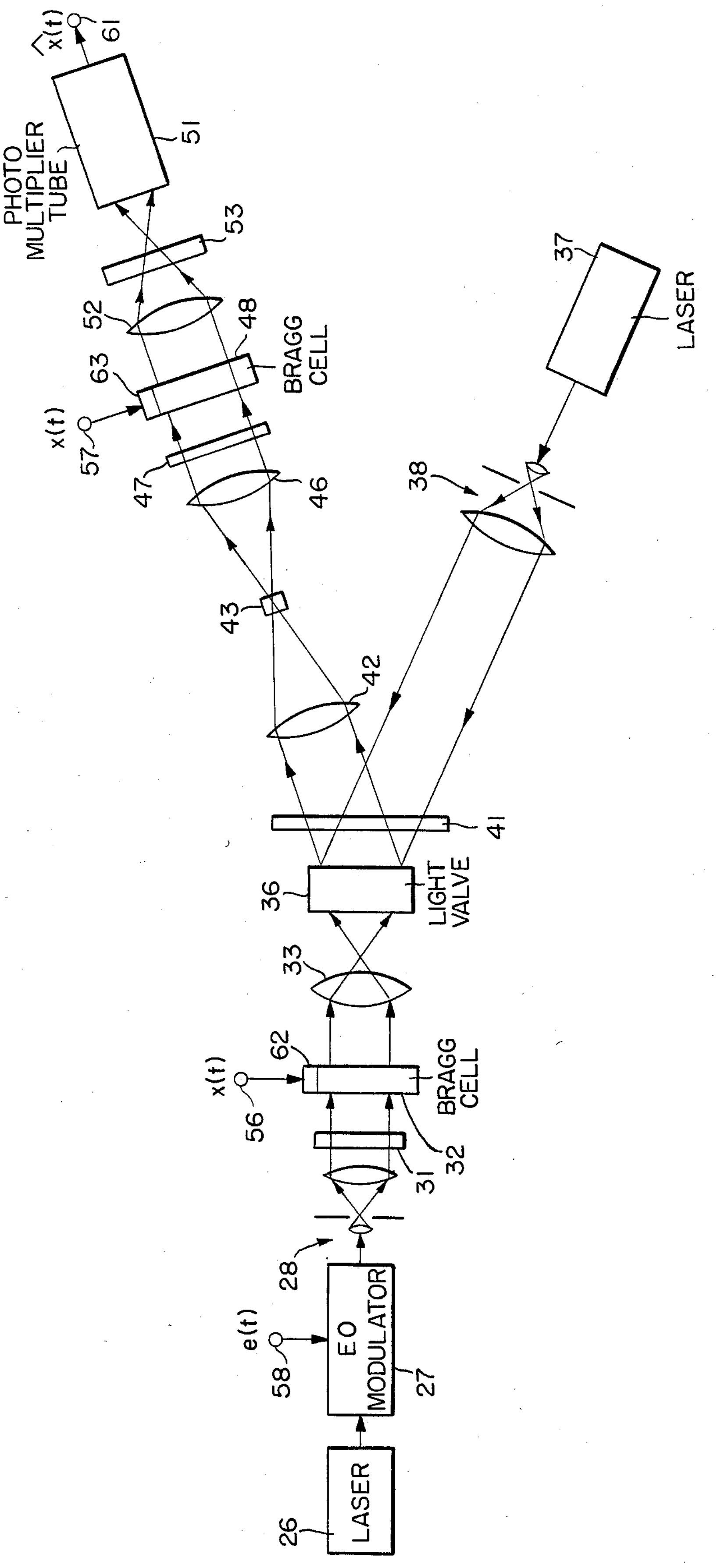
FIG. 3 is a schematic representation of the optical portion of FIG. 2.

FIG. 3 is a schematic representation of the optical processor 22 of FIG. 2. It includes a first laser 26 which emits a beam of coherent light to illuminate the face of an electro-optic modulator 27, which would incorporate an analyzer at its output. The light beam from modulator 27 passes through a first collimator 28 and a cylindrical lens 31 to illuminate a Bragg cell 32. Output from Bragg cell 32 is imaged by a spherical lens 33 onto the photodetector side of liquid crystal light valve 36. A second laser 37 emits a beam of light which is focused by a collimator 38 and cylindrical lens 41 onto the liquid crystal side of light valve 36. Output from light valve 36 passes through a lens system including a cylindrical lens 41, a spherical lens 42, a polarizer 43, a spherical lens 46, and a cylindrical lens 47 onto a second Bragg cell 48. The modulated signal from Bragg cell 48 is focused onto a photomultiplier tube 51 (or other high speed photodetector) by a spherical lens 52 and a cylindrical lens 53. The signal x(t) (modified by bias $b_1$ and carrier $\cos \omega_c t$) from source 11 of FIG. 2 is provided to Bragg cell 32 via terminal 56 and to Bragg cell 48 through terminal 57. The error signal e(t) from differential amplifier 13 of FIG. 2 is routed to electrooptic modulator 27 through terminal 58. The approximation signal $\hat{x}(t)$ from photomultiplier tube 51 connects to amplifier 23 of FIG. 2 through terminal 61.

Bragg cell 32 functions as a tapped delay line except that it allows continuous rather than discrete tapping. The product of the time aperture and the Bragg cell bandwidth establishes the maximum possible number of taps. A transducer 62 attached to one end of Bragg cell 32 launches an acoustic wave, defined by the electrical signal x(t), into the cell. A similar transducer 63 is attached to Bragg cell 48. If d is the distance traveled from the transducer to a point within the Bragg cell and v is the velocity of wave propagation in the Bragg cell material, then d/v is the time delay to any position d in the cell. Light passing through a Bragg cell at position d will be intensity modulated by $x(t-(d/v))$, where x(t) is the electrical input to the cell's transducer.

Laser 26 emits a beam of coherent light which is intensity modulated by the electrical signal e(t) provided on terminal 58 as it passes through a first modulator, electrooptic modulator 27. This first intermediate optical signal is collimated by the collimator 28 and converged vertically by cylindrical lens 31 before being focused into a second modulator, Bragg cell 32. The information signal x(t) on terminal 56 intensity modulates the beam passing through cell 32 to yield a second intermediate optical signal representing the product $x(t-(d/v))e(t)$. Of particular value is the fact that products for all delays, d/v, are computed in parallel.

A spherical lens 33 causes the beam emerging from cell 32 to be imaged onto the input face of a liquid crystal light valve 36. A second light beam, from laser 37, is collimated by the collimator 38 and directed onto the other (output) face of light valve 36. This "read" beam causes the integral of the product, $x(t-(d/v))e(t)$, to be read off the output face of the light valve. The polarization of the read beam is rotated by light valve 36 by an amount proportional to the value of the integral at each position on the light valve. The tap weight values are thus represented by the polarization of light in a third intermediate optical signal reflected from light valve 36. Cylindrical lens 41 is utilized twice; first to bring the collimated read beam from laser 37 to a horizontal line to read the tap weights produced by a third modulator, the liquid crystal side of liquid crystal light valve 36, and then to recollimate the reflected beam vertically to its original height. Spherical lens 42 focuses the beam onto a polarizer 43, which converts the polarization to intensity. The resulting beam is then rendered horizontal and imaged onto a fourth modulator, Bragg cell 48, by spherical lens 46 and cylindrical lens 47.

Information signal x(t), provided to terminal 57, modulates the beam passing through Bragg cell 48 to create a fourth intermediate optical signal representing the products $a_d x(t-(d/v))$ for all values of d. These products, or weighted samples, are next summed on photomultiplier tube 51 to provide an electrical output, equal to the approximation $\hat{x}(t)$ at terminal 61. This output is amplified by amplifier 23 (FIG. 2) and routed to the negative input of difference amplifier 13. The electrical signal representing the difference of the electrical output of photomultiplier tube 51 and the information signal is the electrical signal e(t) which is provided to terminal 58.

Optical implementation of an adaptive filter imposes a number of unique problems solved in this embodiment. Since intensity is the square modulus of amplitude, it can have only positive values. It is thus necessary to introduce direct current biases into the system.

Figure 4:
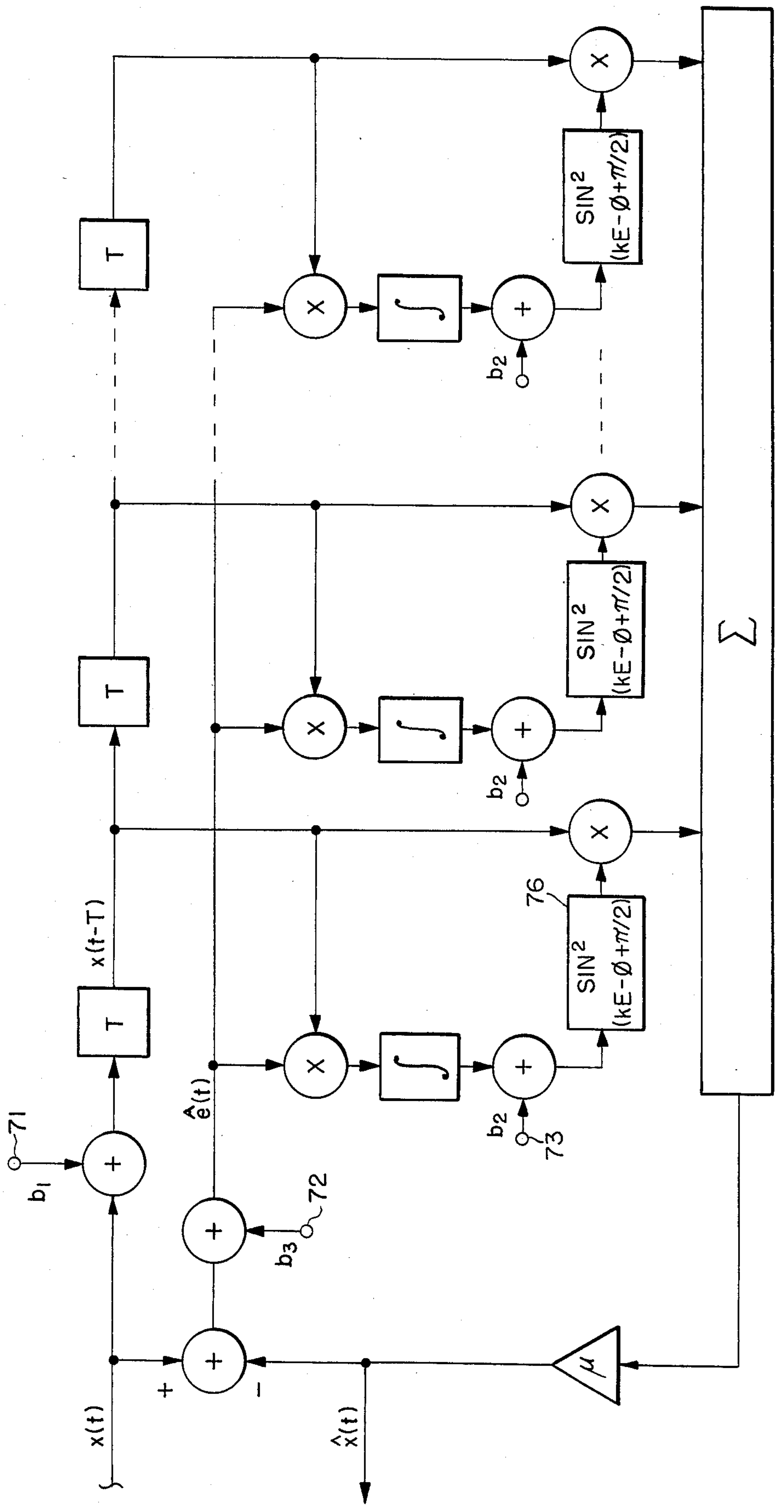
FIG. 4 is a block diagram representative of an adaptive filter modified in accordance with the teaching of my invention.

FIG. 4 is a block diagram of an adaptive filter modified in accordance with the teaching of my invention. A bias $b_1$ introduced at terminal 71 and a bias $b_3$ introduced at terminal 72 eliminate the possibility of negative values from the signal x(t).

Bias $b_2$, introduced at terminal 73, is a result of normal light valve operation and is due to the collimated read beam used on the output side of the light valve. In addition, a light valve is not a perfect integrator, but performs a running integration over an effective finite time, T. The effects of nonnegative tap weights and finite integration time compensate for each other somewhat, but the limited integration period does prevent the error signal e(t) from ever going to zero and remaining there. If it were to go to zero, the inputs to the integrators would be zero, just as before, but eventually the integrator outputs would be zero too, due to the finite integration time. Hence, the error signal must reach some non-zero equilibrium value in this implementation. Another modification of the prior art is the $\sin^2(kE-\phi+(\pi/2))$ operation referred to at 76 in FIG. 4. Due to the response of light valve 36, the polarization rotation, $\alpha$, of the incident read beam varies approximately linearly with the integrated input exposure E ($\alpha=kE$). One thus obtains an intensity output from polarizer 43 proportional to $\sin^2(kE-\phi+(\pi/2))$, where $\phi$ is the angle that the polarizer axis makes with the incident read beam polarization. The component of modulated light parallel to the polarizer axis is proportional to $\cos(\phi-\alpha)$, which equals $\cos(\alpha-\phi)$. Therefore the transmitted intensity is $$\cos^2(\alpha-\phi)=\cos^2(kE-\phi)=\sin^2(kE-\phi+(\pi/2)).$$

The optical adaptive filter described hereinabove is a preferred embodiment, but many variations and modifications are immediately apparent to one understanding the operation of this device. The invention represented by this embodiment is set forth in the claims which follow.

We claim:

1. An electrooptic signal processing apparatus, comprising:

a source of an electrical information signal;

a first source of coherent light;

first modulating means for intensity modulating the output of said first light source in response to an electrical signal to produce a first intermediate optical signal;

second modulating means for modulating said first intermediate optical signal in response to delayed samples of said information signal to produce a second intermediate optical signal;

means for integrating said second intermediate optical signal;

a second source of coherent light;

third modulating means for modulating the output of said second light source in accordance with the integrated values of said second intermediate optical signal to produce a third intermediate optical signal proportional to the integrated signals;

fourth modulating means for modulating said third intermediate optical signal in response to delayed samples of said information signal to provide a fourth intermediate optical signal comprising a plurality of weighted samples;

means for converting said fourth intermediate optical signal into an electrical output representative of the sum of said weighted samples;

means for producing an electrical signal representing the difference of said electrical output and said information signal; and means for providing said difference signal to said first modulating means.

2. The apparatus of claim 1 wherein said first and second light sources are lasers.

3. The apparatus of claim 2 wherein said first modulating means is an electrooptic modulator.

4. The apparatus of claim 3 wherein said second modulating means is a Bragg cell.

5. The apparatus of claim 4 wherein said integrating means is the photodetector side of a liquid crystal light valve.

6. The apparatus of claim 5 wherein the third modulating means is the liquid crystal side of a liquid crystal light valve.

7. The apparatus of claim 6 wherein said fourth modulating means is a Bragg cell.

8. The apparatus of claim 7 wherein said converting means is a photomultiplier tube.

9. The apparatus of claim 8 wherein said difference producing means is a differential amplifier.

* * * * *